United States Patent
Baker et al.

(10) Patent No.: US 9,647,794 B2
(45) Date of Patent: May 9, 2017

(54) CHANNEL STATE INFORMATION FEEDBACK

(75) Inventors: Matthew P. J. Baker, Kent (GB); Federico Boccardi, San Nicolo (IT)

(73) Assignee: Alcatel Lucent, Boulogne-Billancourt (FR)

( * ) Notice: Subject to any disclaimer, the term of this patent is extended or adjusted under 35 U.S.C. 154(b) by 597 days.

(21) Appl. No.: 13/580,732

(22) PCT Filed: Feb. 14, 2011

(86) PCT No.: PCT/EP2011/000670
§ 371 (c)(1),
(2), (4) Date: Aug. 23, 2012

(87) PCT Pub. No.: WO2011/103966
PCT Pub. Date: Sep. 1, 2011

(65) Prior Publication Data
US 2012/0314611 A1 Dec. 13, 2012

(30) Foreign Application Priority Data
Feb. 23, 2010 (EP) .................................. 10360011

(51) Int. Cl.
*H04L 1/00* (2006.01)
(52) U.S. Cl.
CPC ............ *H04L 1/0026* (2013.01); *H04L 1/003* (2013.01); *H04L 1/0027* (2013.01); *H04L 1/0029* (2013.01)
(58) Field of Classification Search
None
See application file for complete search history.

(56) References Cited

U.S. PATENT DOCUMENTS

| 6,771,667 B2 | 8/2004 | Paneth et al. |
| 7,957,701 B2 | 6/2011 | Alexiou et al. |
| (Continued) | | |

FOREIGN PATENT DOCUMENTS

| CN | 101 388 700 A | 3/2009 |
| JP | 2008-538487 | 10/2008 |
| (Continued) | | |

OTHER PUBLICATIONS

Jeon et al, An Enhanced Channel-Quality Indication (CQI), Reporting Scheme for HSDPA Systems, IEEE Communications Letters, vol. 9, No. 5, May 2005.*
Ericsson et al., "A Flexible Feedback Concept," 3GPP TSG-RAN WG1 #59bis, R1-100051, XP050417800, pp. 1-5, Valencia, Spain, Jan. 18-22, 2010.
(Continued)

*Primary Examiner* — Hassan Phillips
*Assistant Examiner* — Gautam Sharma
(74) *Attorney, Agent, or Firm* — Fay Sharpe, LLP

(57) ABSTRACT

An apparatus and method for feeding back channel state information are disclosed. The method of providing channel state information for a wireless communications channel provided between a first network node having at least one transmission antenna and a second network node having at least one reception antenna comprises the steps of: estimating a current value of at least a first type of channel state information for at least one sub-channel within the channel from signals received by the at least one reception antenna over the channel from the at least one transmission antenna; determining whether the current value of the first type of channel state information varies from previously-transmitted value for the first type of channel state information by at least a predetermined amount; and if so, transmitting an indicator indicative of the current value for the first type of channel state information to the first network node.

14 Claims, 3 Drawing Sheets

(56) References Cited

U.S. PATENT DOCUMENTS

| | | | |
|---|---|---|---|
| 2002/0110088 A1* | 8/2002 | Lundby | H04W 52/226 370/252 |
| 2005/0232156 A1* | 10/2005 | Kim et al. | 370/236 |
| 2006/0274712 A1* | 12/2006 | Malladi et al. | 370/345 |
| 2007/0218917 A1* | 9/2007 | Frederiksen et al. | 455/450 |
| 2008/0095185 A1 | 4/2008 | DiGirolamo et al. | |
| 2008/0299917 A1 | 12/2008 | Alexiou et al. | |
| 2010/0202372 A1* | 8/2010 | Chun et al. | 370/329 |
| 2011/0194594 A1* | 8/2011 | Noh et al. | 375/224 |
| 2012/0058730 A1* | 3/2012 | Jitsukawa et al. | 455/63.1 |
| 2012/0113861 A1* | 5/2012 | Chun et al. | 370/252 |

FOREIGN PATENT DOCUMENTS

| | | |
|---|---|---|
| KR | 10-2008-0013473 | 2/2008 |
| RU | 2292647 C2 | 1/2007 |
| RU | 2343646 C2 | 1/2009 |
| RU | 2353063 C2 | 4/2009 |
| WO | WO 2008/018761 A2 | 2/2008 |
| WO | WO 2008/051466 A2 | 5/2008 |

OTHER PUBLICATIONS

Boccardi et al., "Hierarchical Quantization and its Application to Multiuser Eigenmode Transmissions for MIMO Broadcast Channels with Limited Feedback," IEEE International Symposium on Personal, Indoor and Mobile Radio Communications, XP031168826, pp. 1-1-5, Sep. 1, 2007.

Trivellato et al., "On Transceiver Design and Channel Quantization for Downlink Multiuser MIMO Systems with Limited Feedback," IEEE Journal on Selected Areas in Communications, XP011236225, pp. 1494-1504, Oct. 1, 2008.

Alcatel-Lucent et al., "Overview of hierarchical codebook approach," 3GPP TSG RAN WG1 #59b1s, R1-100431, XP050418078, pp. 1-5, Valencia, Spain, Jan. 18-22, 2009.

International Search Report for PCT/EP2011/000670 dated Jun. 30, 2011.

Official Decision of Grant for corresponding Russian Application No. 2012140489, dated Feb. 20, 2014, 26 pages.

Huawei, "Adaptive codebook designs and simulation results," 3GPP TSG RAN WG1#59bis, R1-100797, Valencia, Spain, Jan. 18-22, 2010, Agenda Item: 7.2.4.1, Document for: Discussion and Decision, 6 pages.

* cited by examiner

CHANNEL STATE INFORMATION FEEDBACK

FIELD OF THE INVENTION

The present invention relates to an apparatus and method for feeding back channel state information.

BACKGROUND

Base stations in wireless communications systems provide wireless connectivity to user equipment within the geographic areas, or cells, associated with the base station. The wireless communications links between the base station and each of the user equipment typically include one or more downlink (or forward) channels for transmitting information from the base station to the user equipment and one or more uplink (or reverse) channels for transmitting information from the user equipment to the base station. Multiple-input-multiple-output (MIMO) techniques may be employed when the base station and, optionally, the user equipment include multiple antennas. For example, a base station that includes multiple antennas can transmit multiple independent and distinct signals to multiple user equipment concurrently on the same frequency band.

For example, consider a cellular system with M antennas at the base station and N antennas at the user equipment. In such communication systems, the radio channel between the base station and the user equipment can be described in terms of N×M links (sub-channels). Each link typically has a time-varying complex gain (i.e. amplitude and phase). If the radio channel is wide band (i.e. the signal rate is greater than the delay spread of the channel), the complex gain varies across the bandwidth of the transmitted signal. The overall state of the radio channel can therefore be described as a series of complex weights. This channel state information is measured by the user equipment and fed back to the base station in order to allow the base station to adapt characteristics of the signals transmitted to the user equipment to match in the most appropriate way to the prevailing channel state in order to improve, for example, throughput.

Although techniques exist to provide channel state information feedback, they each have their own shortcomings. Accordingly, it is desired to provide an improved technique for providing channel state information.

SUMMARY

According to a first aspect there is provided a method of providing channel state information for a wireless communications channel provided between a first network node having at least one transmission antenna and a second network node having at least one reception antenna, the method comprising the steps of: estimating a current value of at least a first type of channel state information for at least one sub-channel within the channel from signals received by the at least one reception antenna over the channel from the at least one transmission antenna; determining whether the current value of the first type of channel state information varies from previously-transmitted value for the first type of channel state information by at least a predetermined amount; and if so, transmitting an indicator indicative of the current value for the first type of channel state information to the first network node.

The first aspect recognises that a problem with existing techniques is that a given type of channel state information is transmitted even when that type of channel state information provides little improvement in, for example, throughput. This is because although channel state information is beneficial for improving the throughput of transmissions between the first and second network node, relatively large periods of time may exist when the degree of change or variation in a particular aspect of the channel state described by a given type of channel state information is relatively low and relatively little benefit is derived from providing these statically arranged, periodic updates in that type of channel state information since only minor changes to the characteristics of the signals transmitted will be made which may have little effect on throughput.

Accordingly, an estimation or determination of the current channel state for each type of channel state information is made for each channel or sub-channel. The variation or deviation of the current channel state from the most recently transmitted channel state information for that type is then determined or calculated. Should the difference between the current channel state and the most recently transmitted channel state information be greater than or equal to a predetermined threshold amount, then an indication of the current channel state is transmitted to the first network node. In this way, it can be seen that only when a suitably large variation in the channel state for that type of channel state information occurs are resources allocated for the transmission of the current channel state to the first network node. This means that resources need not be regularly allocated for the transmission of the current channel state information, but these resources may be dynamically utilised as and when the need arises. Hence, should there be little benefit in updating the channel state, then no update need occur for that type of channel state information. However, when a significant change in channel state does occur, then an update may be transmitted. Such an approach helps to minimise the routine allocation of resources, thus freeing these resources for, for example, transmission of another type of channel state information. Accordingly, rather than routinely providing channel state updates for each type of channel state information, these updates only occur on demand, when providing such an update makes a measured improvement to throughput. For example, a situation can occur where the geographical relationship between the network nodes is relatively static, as are any major sources of interference or reflection. Therefore, for relatively large periods of time, the channel state environment is reasonably static. In those situations, there is a reduced need to provide channel state updates since those updates are likely to only provide a minimal benefit to throughput. However, when the geographical relationship between the two network nodes is changing rapidly or where major sources of interference or reflection are also changing, the throughput may be significantly affected due to a comparatively rapidly changing channel state environment which may be ameliorated through providing channel state updates.

In one embodiment, the step of transmitting comprises the step of: transmitting an indicator indicative of a current value of a second type of current channel state information when the step of determining indicates that the current value of the first type of channel state information does not vary from the previously-transmitted value of the first type of channel state information by at least the predetermined amount. Hence, the channel state information may comprise different types or components of channel state, each of which may be transmitted. Theses different types may relate to different characteristics of the channel state. Some types of channel state information may represent characteristics of the channel state which vary quickly, whilst others may vary more slowly. Likewise, some types of channel state information may represent characteristics of the channel state which vary more quickly at some times, whilst others may vary more quickly at other times. When no update for one type of channel state information is necessary, the resources that would have otherwise been routinely allocated to enable transmission of that unnecessary update may instead be allocated to support the transmission of updates of other types of channel state information. It will be appreciated that this enables the available resources to be dynamically allocated to enable the transmission of updates of that type of channel state information for each channel or sub-channel which best improves the performance of the channel or sub-channel.

In one embodiment, the step of transmission comprises the step of: avoiding transmission of the indicator indicative of the current value of the first type of channel state information when the step of determining indicates that the current value of the first type of channel state information does not vary from the previously-transmitted value of the first type of channel state information by at least the predetermined amount. This embodiment recognises that a problem with existing techniques is that the amount of resources allocated for the transmission of channel state information is generally constant which prevents those resources being utilised for other purposes, in particular for being redistributed between the different types of channel state information. For example, channel state information may be regularly transmitted at the same periodic interval from the second network node to the first network node. If these resources cannot be dynamically redistributed between different types of channel state information, it means that more resources than necessary will need to be periodically allocated to enable all types of channel state information to be transmitted sufficiently frequently, which provides a constant drain of these finite resources. Accordingly, should one aspect of the current channel state have not varied from the most recently transmitted channel state information for that channel or by greater than the predetermined amount, then no update to that aspect of the channel state need be provided and so the resources for the transmission for such an update can be reallocated. This helps to ensure that resources are only allocated when required and frees up these resources for other uses at other times. This means that resources need not be regularly allocated for the transmission of every aspect of the current channel state, but these resources may be dynamically utilised as and when the need arises.

In one embodiment, the method comprises the step of: receiving an indicator indicative of the predetermined amount from the first network node. Accordingly, the first network node which may be, for example, a base station, may set the predetermined amount based on, for example, quality or other measurements made by the base station. In this way, the first network node is able to control the extent of any deviation of the channel state which is acceptable without triggering the occurrence of a channel state update.

In one embodiment, a Frobenius matrix may be utilised to determine whether the current value of the at least a first type of channel state information varies from a previously-transmitted value of the at least a first type of channel state information by more than the predetermined amount. In such an embodiment, the previously transmitted channel state information may be stored as a matrix and compared against a matrix storing the current channel state information.

In one embodiment, the distance between vectors used to quantise the channel state information may be used to determine whether the current value of the at least a first type of channel state information varies from a previously-transmitted value of the at least a first type of channel state information by more than the predetermined amount. If the change in the channel state information is greater than the distance between a predetermined number of the vectors the predetermined amount can be determined to have been exceeded. In one such embodiment, if the change in the channel state information is greater than the complete span of the space described by the set of vectors, then the predetermined amount can be determined to have been exceeded.

In one embodiment, the indicator indicative of the current value of at least the first type of channel state information comprises an indicator indicative of a difference between the current value of at least the first type of channel state information and the previously-transmitted value of at least the first type of channel state information. Accordingly, rather than transmitting the complete channel state information to the first network node, only the difference needs be transmitted. It will be appreciated that transmitting the difference will often further reduce the amount of information that needs to be transmitted, thereby also reducing the resources needed to be allocated.

In one embodiment, the step of transmitting comprises the step of: transmitting one of an indicator indicative of the current value of the first type of channel state information when the step of determining indicates that the current value of the first type of channel state information varies from the previously-transmitted value of the first type of channel state information by at least a first predetermined amount and an indicator indicative of the current value of the second type of channel state information when the step of determining indicates that the current value of the second type of channel state information varies from the previously-transmitted value of the second type of channel state information by at least a second predetermined amount in preference to the other. Accordingly, different threshold levels of change may be set which are appropriate for each of these different types of channel state information. Also, this embodiment recognises that a problem with the static update approach mentioned above is that the updates occur irrespective of whether such updates provide a beneficial effect on the throughput. Furthermore, the static update approach provides updates for one type of channel state typically more frequently than updates for other types of channel state. In contrast, enabling the transmission of either one type of channel state information in preference to the other type of channel state information, or vice versa, provides flexibility to prioritise the transmission of one component or type of the channel state information over the other. In one embodiment, the second predetermined amount may be zero to cause updates to the second type of channel state information to be regularly provided.

In one embodiment, the step of transmitting comprises the step of: increasing a number of bits utilised for transmitting the one of the indicator indicative of the current value of the first type of channel state information and the indicator indicative of the current value of the second type of channel state information in preference to the other. Accordingly for the channel state information given priority, the number of bits available for that preferential type of channel state information is increased. This helps to ensure that the preferential type of channel state information is allocated more resources at that time than other types of channel state information.

In one embodiment, the step of transmitting comprises the step of: increasing a number of time slots utilised for transmitting the one of the indicator indicative of the current value of the first type of channel state information and the indicator indicative of the current value of the second type of channel state information in preference to the other.

In one embodiment, the first type of channel state information comprises long-term channel state information, the second type of channel state information comprises short-term channel state information and the step of transmitting comprises the step of: transmitting the indicator indicative of the current long-term channel state information when the step of determining indicates that the current value of the long-term channel state information varies from the previously-transmitted value of the long-term channel state information by at least the first predetermined amount. Hence, the channel state information may relate to long-term and short-term channel state characteristics. So-called long-term and short-term channel state information is well known in the art and indicates different components or characteristics of the channel state information. For example, the long-term channel state information may capture the spatial correlation properties of the channel which usually changes slowly over time and over frequency. Such long-term channel state information may typically represent the correlation between antennas, an averaged signal to noise plus interference ratio (SNIR), a pathloss, and the like. As mentioned above, these characteristics vary comparatively slowly. The other component or type is the so-called short-term channel state information which represents instantaneous properties of the channel which are generally rapidly varying in time and frequency. Typically, such short-term channel state information may be the phase and amplitude of signals being received, the instantaneous SNIR, and the like. Known techniques provide both the short-term and long-term channel state information for each channel or sub-channel which, when combined, provides an indication of the overall channel state. These known techniques typically provide channel state updates at regular periodic intervals with many short-term updates being provided for each long-term update. However, in this embodiment, the long-term channel state information is only updated when a sufficiently large change in this channel state information occurs. In embodiments, changes to the short-term channel state information may otherwise be transmitted since this channel state is likely to vary most quickly.

In one embodiment, the step of transmitting comprises the step of: transmitting an indicator indicative of the current value of the long-term channel state information in preference to transmitting the indicator indicative of the current value of the short-term channel state information when the step of determining indicates that the current value of the long-term channel state information varies from the previously-transmitted value of the long-term channel state information by at least the first predetermined amount. Accordingly, should a significant change in the long-term channel state occur, then this may be transmitted in preference to changes in the short-term channel state.

In one embodiment, the step of transmitting comprises the step of: increasing an allocation of bits for transmitting the current value of the long-term channel state information. Accordingly, more bits may be allocated to support the transmission of the update to the long-term channel state information. It will be appreciated that such an approach was not possible in the known techniques which only enable a predetermined fixed number of bits to be utilised at fixed periodic intervals.

In one embodiment, the transmissions occur within timeslots and the step of transmitting comprises the step of: increasing allocation of time slots for transmitting the current value of the long-term channel state information. By increasing the number of time slots allocated for the long-term channel state updates, the speed with which such updates can occur is increased, thereby improving the throughput. It will be appreciated that this approach was also not possible with the known techniques which required that the long-term channel state updates could only occur at fixed periodic intervals thereby delaying the speed at which such updates could be made.

In one embodiment, the method comprises the steps of: arranging the current value of the at least a first type of channel state information into at least one vector; and quantising the at least one vector by selecting one of a plurality of codebook vectors at a first level of a hierarchical codebook of vectors, the indicator indicative of the current value of the at least a first type of channel state information comprising an indication of an index to the one of a plurality of codebook vectors. It will be appreciated that such hierarchical code books of vectors provide a number of code book vectors at each level of the hierarchical code book, each of which is selected based on predetermined criteria such as, for example, that code book vector being, for example, the closest match to the vector to be quantised, the best match to that vector or offering the minimum error, although it will also be appreciated that other selection criteria may be applied since using a hierarchical code book enables subsequent refinement to further code book vectors which may better represent the vector being quantised. An index to the selected code book vector may then be provided to the first network node. Hence, rather than transmitting the selected vector itself as the current channel state information, only the index to that vector need be provided, which it will be appreciated will be typically representable with a smaller number of bits. The first network node, which also has a copy of the code books of vectors, can then identify the selected vector and utilise that vector to determine the current channel state information and adapt its transmission accordingly. Hence, it can be seen that the amount of channel state feedback information provided can be drastically reduced.

In one embodiment, the method comprises the steps of: requantising the at least one vector by selecting one of a plurality of hierarchically-related codebook vectors from hierarchically-related levels of the hierarchical codebook of vectors, the indicator indicative of the current value of the at least a first type of channel state information comprising an indication of an index to the one of a plurality of hierarchically-related codebook vectors. Accordingly, the quantisation of the vector may be successively refined by selecting code book vectors which are related to the vector whose index has been previously advised to the first network node. This successive refinement or requantisation enables an improved indication of the current channel state information to be provided back to the first network node over time.

In one embodiment, the one of a plurality of hierarchically-related codebook vectors from hierarchically-related levels of the hierarchical codebook of vectors comprises one of a plurality of child codebook vectors from child levels of the hierarchical codebook. Accordingly, for vectors which change slowly over time, subsequent refinements in their quantisations may be possible by selecting child code book vectors of the code book vector previously indicated to the first network node. Such child code book vectors are typically closer refinements of the previously advised parent code book vector.

In one embodiment, the one of a plurality of hierarchically-related codebook vectors from hierarchically-related levels of the hierarchical codebook of vectors comprises one of a plurality of parent codebook vectors from parent levels of the hierarchical codebook. Hence, for more rapidly changing channel state, it may be necessary to traverse to parent levels of the hierarchical code book to select a more appropriate code book vector which quantises the vector.

In one embodiment, differing hierarchical codebooks of vectors are provided for the first type of channel state information and the second type of channel state information, at least one of the codebooks being hierarchical. Accordingly, different code books or sets of code books may be provided for each of the short-term and long-term channel state information. It will be appreciated that each of those code books or sets of code book may be optimised for those different types of channel state information.

In one embodiment, the indicator indicative of the current value of the at least a first type of channel state information encodes an identifier indicating which of the hierarchical codebooks of vectors was used to quantise or requantise the at least one vector. Accordingly, the indicator may encode an identifier which informs the recipient which hierarchical code book of vectors was used to encode the vector. It will be appreciated that this indication may explicitly indicate which particular hierarchical code book of vectors was used or provide a relative indication of the code book of vectors used. For example, if two code books of vectors may be used the indicator may be a single bit; a "0" bit may indicate that one of the code books was used, whereas a "1" may indicate that the other code book was used. Alternatively, a "0" may indicate that the received indication contains a vector from the same code book as that used previously, whereas a "1" may indicate that a different code book to that used previously was used to create that vector. It will be appreciated that there are many ways to implement such absolute and relative indications.

In one embodiment, the indicator indicative of the current value of at least one type of channel state information further comprises a relative or absolute indicator of the level of the codebook of vectors from which the at least one of a plurality of codebook vectors was selected, wherein if the relative or absolute indicator indicates a level not present in the previously-indicated codebook of vectors it indicates the type of channel state information indicated by the indicator indicative of the current value of at least one type of channel state information.

According to a second aspect, there is provided a network node having at least one reception antenna and operable to provide channel state information for a wireless communications channel provided between another network node having at least one transmission antenna and the network node, the network node comprising: estimating logic operable to estimate a current value of at least a first type of channel state information for at least one sub-channel within the channel from signals received by the at least one reception antenna over the channel from the at least one transmission antenna; determination logic operable to determine whether the current value of the first type of channel state information varies from a previously-transmitted value of the first type of channel state information by at least a predetermined amount; and transmission logic operable, if the determination logic indicates that the current value of the first type of channel state information varies from the previously-transmitted value of first type of the channel state information by at least the predetermined amount, to transmit of an indicator indicative of the current value of the first type of current channel state information to the first network node.

In one embodiment, the transmission logic is operable to transmit an indicator indicative of a current value of a second type of current channel state information when the determination logic indicates that the current value of the first type of channel state information does not vary from the previously-transmitted value of the first type of channel state information by at least the predetermined amount.

In one embodiment, the transmission logic is operable to avoid transmission of the indicator indicative of the current value of the first type of channel state information when the determination logic indicates that the current value of the first type of channel state information does not vary from the previously-transmitted value of the first type of channel state information by at least the predetermined amount.

In one embodiment, the network node comprises: reception logic operable to receive an indicator indicative of the predetermined amount from the first network node.

In one embodiment, a Frobenius matrix may be utilised to determine whether the current value of the at least a first type of channel state information varies from a previously-transmitted value of the at least a first type of channel state information by more than the predetermined amount.

In one embodiment, the distance between vectors used to quantise the channel state information may be used to determine whether the current value of the at least a first type of channel state information varies from a previously-transmitted value of the at least a first type of channel state information by more than the predetermined amount. If the change in the channel state information is greater than the distance between a predetermined number of the vectors the predetermined amount can be determined to have been exceeded. In one such embodiment, if the change in the channel state information is greater than the complete span of the space described by the set of vectors, then the predetermined amount can be determined to have been exceeded.

In one embodiment, the indicator indicative of the current value of at least the first type of channel state information comprises an indicator indicative of a difference between the current value of at least the first type of channel state information and the previously-transmitted value of at least the first type of channel state information.

In one embodiment, the transmission logic is operable to transmit one of an indicator indicative of the current value of first type of channel state information when the determination logic indicates that the current value of the first type of channel state information varies from the previously-transmitted value of the first type of channel state information by at least a first predetermined amount and an indicator indicative of the current value of the second type of channel state information when the determination logic indicates that the current value of the second type of channel state information varies from the previously-transmitted value of the second type of channel state information by at least a second predetermined amount in preference to the other.

In one embodiment, the transmission logic is operable to increase a number of bits utilised for transmitting the one of the indicator indicative of the current value of the first type of channel state information and the indicator indicative of the current value of the second type of channel state information in preference to the other.

In one embodiment, the transmission logic is operable to increase a number of time slots utilised for transmitting the one of the indicator indicative of the current value of the first type of channel state information and the indicator indicative of the current value of the second type of channel state information in preference to the other.

In one embodiment, the first type of channel state information comprises long-term channel state information, the second type of channel state information comprises short-term channel state information and the transmission logic is operable to transmit the indicator indicative of the current long-term channel state information when the determination logic indicates that the current value of the long-term channel state information varies from the previously-transmitted value of the long-term channel state information by at least the first predetermined amount.

In one embodiment, the transmission logic is operable to transmit an indicator indicative of the current value of the long-term channel state information in preference to transmitting the indicator indicative of the current value of the short-term channel state information when the determination logic indicates that the current value of the long-term channel state information varies from the previously-transmitted value of the long-term channel state information by at least the first predetermined amount.

In one embodiment, the transmission logic is operable to increase an allocation of bits for transmitting the current value of the long-term channel state information.

In one embodiment, transmissions occur within time-slots and the transmission logic is operable to increase an allocation of time slots for transmitting the current value of the long-term channel state information.

In one embodiment, the network node comprises: arranging logic operable to arrange the current value of the at least a first type of channel state information into at least one vector; and quantisation logic operable to quantise the at least one vector by selecting one of a plurality of codebook vectors at a first level of a hierarchical codebook of vectors, the indicator indicative of the current value of the at least a first type of channel state information comprising an indication of an index to the one of a plurality of codebook vectors.

In one embodiment, the quantisation logic is operable to requantise the at least one vector by selecting one of a plurality of hierarchically-related codebook vectors from hierarchically-related levels of the hierarchical codebook of vectors, the indicator indicative of the current value of the at least a first type of channel state information comprising an indication of an index to the one of a plurality of hierarchically-related codebook vectors.

In one embodiment, the one of a plurality of hierarchically-related codebook vectors from hierarchically-related levels of the hierarchical codebook of vectors comprises one of a plurality of child codebook vectors from child levels of the hierarchical codebook.

In one embodiment, the one of a plurality of hierarchically-related codebook vectors from hierarchically-related levels of the hierarchical codebook of vectors comprises one of a plurality of parent codebook vectors from parent levels of the hierarchical codebook.

In one embodiment, differing hierarchical codebooks of vectors are provided for the first type of channel state information and the second type of channel state information, at least one of the codebooks being hierarchical.

In one embodiment, the indicator indicative of the current value of the at least a first type of channel state information encodes an identifier indicating which of the hierarchical codebooks of vectors was used to quantise or requantise the at least one vector.

In one embodiment, the indicator indicative of the current value of at least one type of channel state information further comprises a relative or absolute indicator of the level of the codebook of vectors from which the at least one of a plurality of codebook vectors was selected, wherein if the relative or absolute indicator indicates a level not present in the previously-indicated codebook of vectors it indicates the type of channel state information indicated by the indicator indicative of the current value of at least one type of channel state information.

According to a third aspect, there is provided a computer program product operable, when executed on a computer, to perform the method steps of the first aspect.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
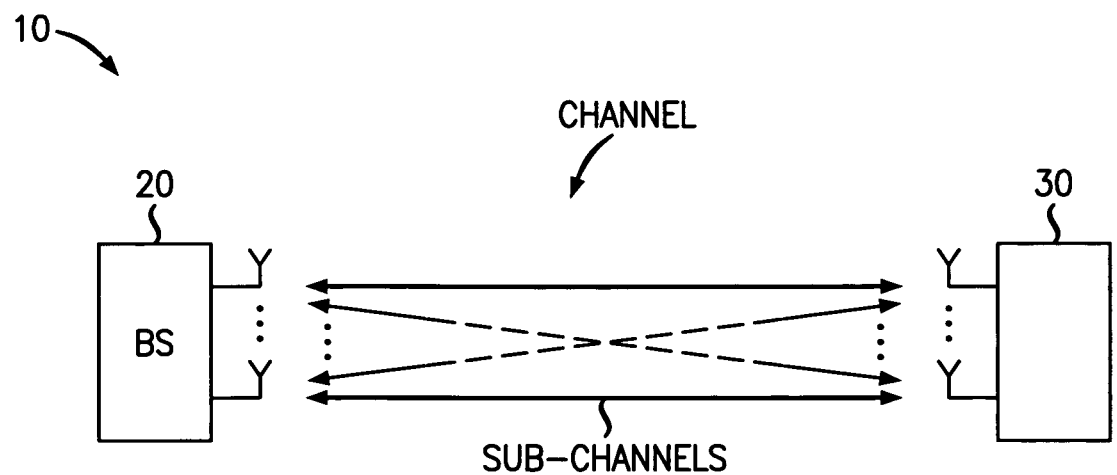
FIG. 1 illustrates the main components of a wireless telecommunications network according to one embodiment.

FIG. 1 illustrates an arrangement of a base station 20 and user equipment 30 of a wireless telecommunications network, generally 10, according to one embodiment. The base station 20 and the user equipment 30 are examples of the first and second network nodes although it will be appreciated that other examples of network nodes to which the present technique may be applied exist and indeed the functionality of the base station and user equipment may be reversed. Although just one base station and user equipment is shown for sake of clarity, it will be appreciated that many such base stations and user equipment may be deployed in such a wireless telecommunications network. Each base station 20 is provided with M antennas, whilst each user equipment 30 is provided with N antennas. Typically, at least one of M and N is an integer value greater than 1. A MIMO radio channel is established between the base station 20 and the user equipment and sub-channels are provided between each antenna of the base station 20 and user equipment 30. It will be appreciated that this arrangement is applicable to both single-user MIMO as well as multi-use MIMO.

The state of the each sub-channel is assessed by the user equipment 30 and fed back to the base station 20 to enable the base station 20 to adapt its transmissions based on the channel state information. The channel state information may comprise many different types of channel state information, each of which shares similar characteristics which together provide an overall indication of the state of the channel. It will be appreciated that these different types of channel state information vary at different times and their significance changes. As will be explained in more detail below, the channel state of sub-channels is fed back from the user equipment 30 to the base station 20 in a dynamic way. That is to say that dynamic scheduling of the channel state feedback occurs, with the most significant changes to channel state being fed back in preference to other changes. The significance of the changes is assessed based on whether the channel state has changed by more than a predetermined amount when compared with a previously provided indication of the channel state. This enables updates relating to non-significant changes in channel state to be avoided, thereby freeing resources which would otherwise have been utilised for those less significant changes. For example, the freed up resources may be utilised to transmit another type of channel state information or indeed to avoid the transmission of any channel state information whatsoever for periods of time.

Each base station 20 comprises at least one processing means adapted to receive an indication of the channel state and means to adjust its transmissions based on this channel state information. Each base station 20 also comprises at least one processing means adapted to at least one predetermined threshold for transmission to the user equipment 30. These threshold may be varied dynamically to adjust the extent of any changes in channel state which may be tolerated prior to an update in channel state needing to be sent from the user equipment 30.

Each user equipment 30 comprises the functionality of a mobile terminal for transmission and reception of signals in a network using radio transmission. Furthermore, the user equipment 30 comprises at least one processing means adapted to determine the at least one type of channel state, assess whether the difference between this channel state and the most recently transmitted channel state for that type exceeds a threshold and, if so, to allocate resources for the transmission of updated channel state information.

Channel State Information Update Scheduling

As mentioned above, each user equipment 30 receives a predetermined threshold for each type of channel state information from the base station 20. These thresholds are stored locally by the user equipment 30 and are used to assess whether an update to that type of channel state information is required or not. In this example, two types of channel state information are described. The first is long-term channel state information, which attempts to describe the spatial-correlation properties of the sub-channel which change slowly over time and over frequency. Examples of this type of channel state information include the correlation between antennas, the average SNIR, as well as pathloss. The other type of channel state information is short-term channel state information, which tries to match the instantaneous properties of the sub-channel, which are varying in time and frequency. Examples of such short-term channel state information include instantaneous SNIR signal phase and amplitude.

On initialisation, the user equipment will determine the channel state for each of its sub-channels and store this information as one or more matrices within the user equipment 30. The user equipment 30 will determine that no channel state information has been provided to the base station 20 and so will begin allocating resources for transmitting this channel state information to the base station 20. In this example, the channel state information is transmitted over a control sub-channel between the user equipment 30 and the base station 20. However, it will be appreciated that other mechanisms for transmitting the channel state information may be utilised. In this example, the transmission of changes to long-term channel state information is given priority over changes in short-term channel state information. However, other types of channel state information may be given preference in other arrangements. Accordingly, the initial long-term channel state information is fed back to the base station 20, followed by the initial short-term channel state information. Details of this channel state information for each type fed back to the base station 20 are stored, typically as a matrix, within the user equipment 30.

Thereafter, as the user equipment 30 measures the current channel state being experienced by that user equipment 30, the measured current state is stored in one or more corresponding matrices. The previously-transmitted channel state and the current channel state may be compared using a Frobenius matrix to estimate the variation between the matrices. When a variation for that type of channel state information is greater than a corresponding threshold provided by the base station 20, then the user equipment will allocate resources for the transmission of the updated channel state information for that type.

Figure 2:
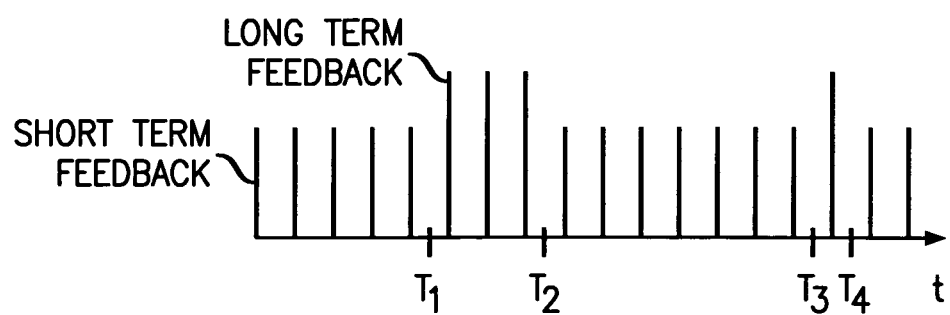
FIG. 2 illustrates scheduling of channel state update messages.

For example, as shown in FIG. 2, at time interval Ti, the current long-term channel state is judged to have changed by an amount which is greater than the threshold, which triggers the allocation of resources for the transmission of the current long-term channel state information to the base station 20 in preference to the transmission of the current short-term channel state information. Hence, the current long-term channel state information is transmitted to the base station 20 from the user equipment 30 over a number of consecutive time slots. In this example, the change in long-term channel state information was relatively high and required a number of time slots to enable sufficient information about these changes to be conveyed to the base station 20. In order to minimise the amount of information that needs to be transmitted to the base station 20, rather than transmitting an absolute indicator of the channel state information each time a change occurs, an indication of the difference between the current channel state and the previously transmitted channel state may instead be provided. Also, as will be explained in more detail below, a hierarchical feedback system may be used to successively refine the information being fed back. At time $T_2$, sufficient information regarding the current long-term channel state has been transmitted to the base station 20 and so no further resources are required to be allocated for the transmission of long-term channel state information.

However, at time $T_3$, another change to the long-term channel state which is greater than the predetermined amount is detected, but in this example only one time slot is required to convey that change and so, at time $T_4$, no further resources for the transmission of long term channel state information need to be allocated.

Likewise, changes to short term channel state information which are greater than a corresponding threshold for that type of channel state information may be transmitted from the user equipment 30 to the base station 20. In this example, an update to the short-term channel state information is made at every opportunity in every time slot when these resources are not being used to update the long-term channel state information. However, it will be appreciated that once sufficient information on the current short-term channel state has been provided by the user equipment 30 to the base station 20, then no further updates need be provided, thereby freeing these resources for use for other types of channel state information.

In the event that saturation of these updates occurs, which could be detected either by the user equipment 30 or the base station 20, then rather than continuing to transmit a difference, the user equipment may transmit another absolute indication of the channel state information to the base station 20. Likewise, both the user equipment 30 and the base station 20 may instruct a complete update to the channel state information in a similar manner to that performed on initialisation.

Hierarchical Feedback

In this example, a hierarchical feedback system is used to encode the updates to channel state information. This enables the updates to be refined from one reporting instant to the next. This approach works particularly well if the channel state is changing sufficiently slowly so that the feedback can be aggregated over multiple feedback intervals so that the aggregated bits index a larger codebook. In other words, a first message provides an initial approximation of the channel state, with subsequent messages further refining the approximation of the channel state.

Figure 3:
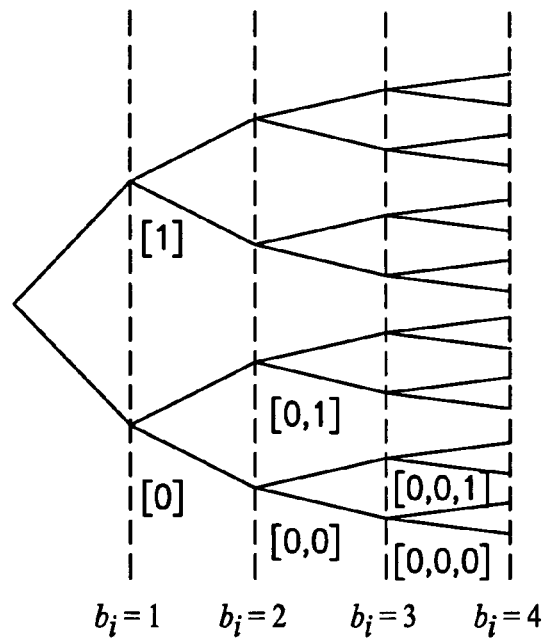
FIG. 3 illustrates an example hierarchical codebook structure.

As it can be seen in FIG. 3, each quantisation codebook can be organized using a binary tree structure, in a way that all the codewords at the $j^{th}$, level have the same j-1, significant bits. Such a structure can be used as an enabler for hierarchical quantisation.

The hierarchical quantisation method can be explained referring to two messages, the basic feedback message and the refined feedback message. The basic feedback message is obtained by sending back to the base station 20 $b_i$, bits specifying the best quantisation codeword at level $b_i$, of the binary tree, typically by specifying its index. The refined feedback message is obtained as follows. Assuming that at the time interval t−1, in one embodiment, both the base station 20 and user equipment 30 share a codeword $\hat{h}_i(t-1)$ $\epsilon C_i$, belonging to the l(t−1)>$b_i$, level. It will be appreciated that the base station 20 and user equipment 30 need to save the sequence of selected codewords, starting from the level $b_i$, up to level l(t−1)). The case l(t−1)=$b_i$, can be obtained as a particular case, where an 'UP' move corresponds to a new codeword in the $b_i$, level.

If c=$\hat{h}_i$(t−1), then a new candidate is chosen in the l(t−1)+$b_i$−1, level, $b_i$−1, bits are sent back to the base station 20 indicating the position in the subtree starting from $\hat{h}_i$(t−1), while one bit is used to signal a 'DOWN' move within the tree. If c≠$\hat{h}_i$(t−1), then a new candidate is chosen in the l(t−1)−($b_i$−1) level, $b_i$−1, bits are sent back to the base station 20 indicating the position in the subtree starting from $\hat{h}_i$(t−1), while one bit is used to signal a 'UP' path within the tree.

Figure 4:
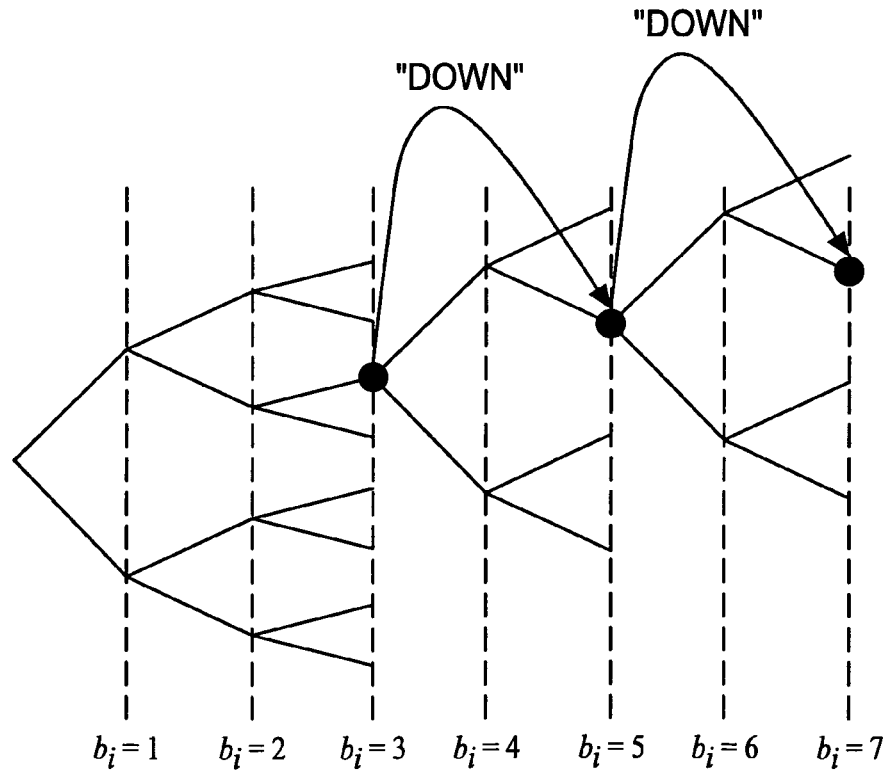
FIGS. 4 and 5 illustrate example utilisations of a hierarchical codebook structure.
Figure 5:
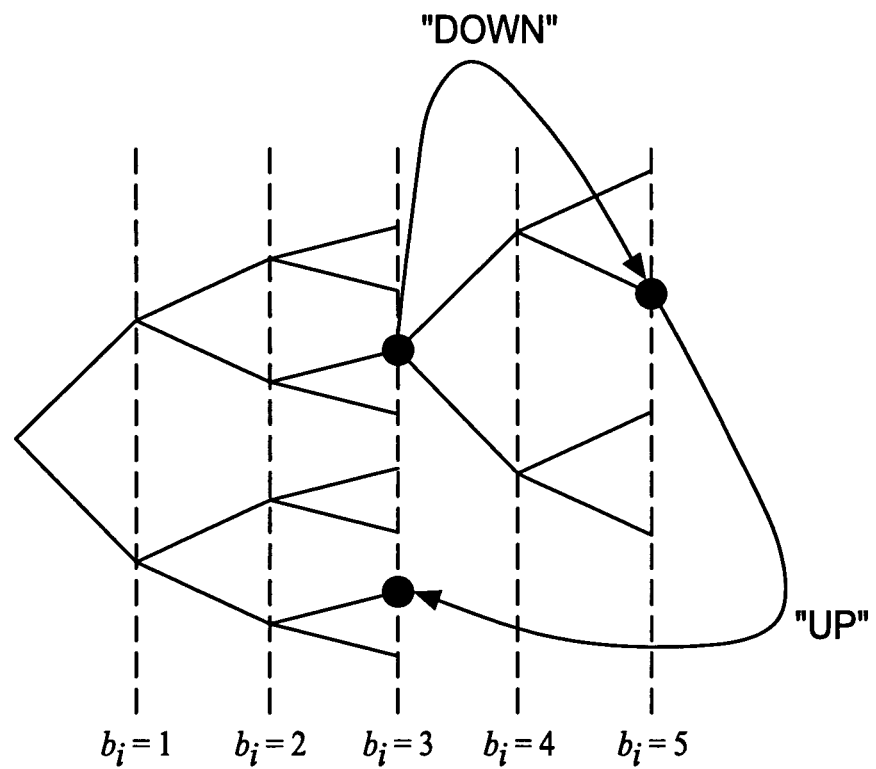

Consider the following two examples shown in FIGS. 4 and 5.

In FIG. 4, at the $t^{th}$, time interval, a refinement ('DOWN') of the quantisation codeword is done starting from l(t−1)=3. A new vector in level 5, is sent back to the base station 20. At the t+1$^{th}$, time interval, a second refinement ('DOWN') is done starting from l(t)=5. A new vector in level 7, is sent back to the base station.

In FIG. 5, at the $t^{th}$, time interval, a refinement ('DOWN') of the quantisation codeword is done starting from l(t−1)=3. A new vector in level 5, is sent back to the base station 20. At the t+1$^{th}$, time interval, due to a channel variation, an 'UP' move is signalled to the base station 20, in the same subtree $\hat{h}_i$(t) belongs to.

The previously described embodiment using bi−1, bits for signalling the codeword in a given tree level, and 1, bit for signalling an "UP" or "DOWN" move in the tree, can be generalized to the case where xi bits are used for signalling a given codeword in a given tree level, whereas yi bits are used to signal a move in the tree. And these xi,yi can be a function of the level in the tree, user, etc.

Both the base station 20 and the user equipment 30 share the same codebooks. In one embodiment, the base station 20 is operable to transmit codebooks to the user equipment 30 for storage therein.

Accordingly, as can be seen in FIG. 2, each of the feedback updates may be hierarchical feedback updates, providing hierarchical feedback reports, each providing a refined updates aggregated over multiple feedback intervals to index different levels within the corresponding code book. For example, the long-term and short-term channel state information may have different codebooks. Typically, each type of channel state information may have more than one code book, the most appropriate of which may be selected based on the current channel state information. In the example shown in FIG. 2, each of the short-term feed back updates prior to time period $T_1$, may successively refine the short term channel state information by traversing through levels of the hierarchical tree.

The updates may encode an indicator which indicates to the base station 20 that each of these updates relate to the same codebook. The updates to the long-term channel state information occurring between times $T_1$, and $T_2$, may encode an indicator indicating to the base station 20 that these updates relate to long-term channel state information and provide an indication of the corresponding codebook. Hence, each update may encode an indicator of the particular codebook to which that update relates or may instead simply indicate when a change in codebook occurs. For example, if two sets of codebooks are being used then the first update sent after time Ti may simply indicate that a switch from the current short-term codebook to the current long-term codebook needs to be made. Likewise, the first update following time $T_2$, may indicate that a switch from the current long-term codebook to the current short-term codebook needs be made. Likewise, where each type of channel state information utilises more than one codebook then an indicator may be provide within the updates indicating that a change in the codebook for that type of channel state information needs be made. In this way, it can be seen that the appropriate codebook utilise to encode the updated channel state information may be indicated to the base station 20.

In one embodiment, the short-term channel state information feedback reports use levels p to p+q of a hierarchically-structured set of codebooks, and the long-term channel state information feedback is treated as if it corresponds to a level p−1, of the hierarchical structure, even though the long-term feedback typically uses a codebook which is completely unrelated to the codebooks of levels p to p+q which are hierarchically related to each other. Thus when an "up" move is signalled that would effect a transition above level p in the tree, it effectively redefines the meaning of the other bits of the feedback report, signifying that they represent the quantisation of the long-term component of the feedback not the short-term component of the feedback. Similarly, a "down" move from the level p−1, would switch the meaning of the other bits of the feedback report back to being the quantisation of the short-term component of the feedback. In a general embodiment, a single feedback report structure exists, that may be used for either long-term or short-term reporting. It comprises 1, bit that enables the reporting to switch between long-term and short-term components (using different quantisation codebooks), and a further plurality of bits to represent the corresponding quantised long-term or short-term feedback. If the short-term component of the feedback is hierarchically structured, the switch bit enables stepping up or down through the levels of the hierarchy. In some embodiments an additional bit may be provided to provide a "reset" function—i.e. enabling the feedback to jump up to level p of the hierarchy in a single step.

In one embodiment, there is provided a method for reporting two types of channel state information from a secondary station to a primary station, wherein the reports comprise a plurality of bits indicating a value of one or other of the types of channel state information, and at least one bit indicating the type of the channel state information.

In one embodiment, in a first report, a first value of the bit indicating the type of the channel state information indicates a switch from the first type of channel state information to the second type of channel state information, and in the next report the first value of the bit indicating the type of the channel state information indicates a switch from a coarser quantisation level to a finer quantisation level of the second type of channel state information.

In one embodiment, in a first report, a second value of the bit indicating the type of the channel state information indicates a switch from a coarser quantisation level to a finer quantisation level of the second type of channel state information, and in the next report the second value of the bit indicating the type of the channel state information indicates a switch from the second type of channel state information to the first type of channel state information.

In one embodiment, the reports further comprise a bit indicating a reset from the previously-used quantisation level of the second type of channel state information to the coarsest quantisation level of the second type of channel state information.

A person of skill in the art would readily recognise that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of providing channel state information for a wireless communications channel provided between a first network node having at least one transmission antenna and a second network node having at least one reception antenna, said method comprising:
   estimating a current value of at least a first type and a second type of channel state information for at least one sub-channel within said channel from signals received by said at least one reception antenna over said channel from said at least one transmission antenna;
   determining whether said current value of said first type of channel state information varies from a most recently transmitted value for said first type of channel state information by at least a predetermined amount; and
   if so, transmitting an indicator indicative of said current value for said first type of channel state information to said first network node, and transmitting an indicator indicative of said current value of said second type of current channel state information when the determination indicates that said current value of said first type of channel state information does not vary from said most recently transmitted value of said first type of channel state information by at least said predetermined amount;
   wherein said transmission comprises:
     avoiding transmission of said indicator indicative of said current value of said first type of channel state information when the determination indicates that said current value of said first type of channel state information does not vary from said most recently transmitted value of said first type of channel state information by at least said predetermined amount.

2. The method of claim 1, further comprising:
   receiving an indicator indicative of said predetermined amount from said first network node.

3. The method of claim 1, wherein said indicator indicative of said current value of at least said first type of channel state information comprises an indicator indicative of a difference between said current value of at least said first type of channel state information and said most recently transmitted value of at least said first type of channel state information.

4. The method of claim 1, wherein said-transmitting comprises:
transmitting one of
an indicator indicative of said current value of said first type of channel state information when it is determined that said current value of said first type of channel state information varies from a most recently transmitted value of said first type of channel state information by at least a first predetermined amount and
an indicator indicative of said current value of said second type of channel state information when the determination indicates that said current value of said second type of channel state information varies from said most recently transmitted value of said second type of channel state information by at least a second predetermined amount in preference to the other.

5. The method of claim 4, wherein said-transmitting comprises: increasing a number of bits utilised for transmitting said one of said indicator indicative of said current value of said first type of channel state information and said indicator indicative of said current value of said second type of channel state information in preference to the other.

6. The method of claim 4, wherein said-transmitting comprises:
increasing a number of time slots utilised for transmitting said one of said indicator indicative of said current value of said first type of channel state information and said indicator indicative of said current value of said second type of channel state information in preference to the other.

7. The method of claim 3, wherein said first type of channel state information comprises long-term channel state information, said second type of channel state information comprises short-term channel state information and said transmitting comprises:
transmitting said indicator indicative of said current long-term channel state information when the determination indicates that said current value of said long-term channel state information varies from said most recently transmitted value of said long-term channel state information by at least said first predetermined amount.

8. The method of claim 7, wherein said-transmitting comprises:
transmitting an indicator indicative of said current value of said long-term channel state information in preference to transmitting said indicator indicative of said current value of said short-term channel state information when the determination indicates that said current value of said long-term channel state information varies from said most recently transmitted value of said long-term channel state information by at least said first predetermined amount.

9. The method of claim 1, further comprising:
arranging said current value of said at least a first type of channel state information into at least one vector; and
quantising said at least one vector by selecting one of a plurality of codebook vectors at a first level of a hierarchical codebook of vectors, said indicator indicative of said current value of said at least a first type of channel state information comprising an indication of an index to said one of a plurality of codebook vectors.

10. The method of claim 9, further comprising:
requantising said at least one vector by selecting one of a plurality of hierarchically-related codebook vectors from hierarchically-related levels of said hierarchical codebook of vectors, said indicator indicative of said current value of said at least a first type of channel state information comprising an indication of an index to said one of a plurality of hierarchically-related codebook vectors.

11. The method of claim 9, wherein differing hierarchical codebooks of vectors are provided for said first type of channel state information and said second type of channel state information, at least one of said codebooks being hierarchical, and said indicator indicative of said current value of said at least a first type of channel state information encodes an identifier indicating which of said hierarchical codebooks of vectors was used to quantise or requantise said at least one vector.

12. The method of claim 11, wherein said indicator indicative of said current value of at least one type of channel state information further comprises a relative or absolute indicator of the level of said codebook of vectors from which said at least one of a plurality of codebook vectors was selected, wherein if said relative or absolute indicator indicates a level not present in the previously-indicated codebook of vectors it indicates the type of channel state information indicated by said indicator indicative of said current value of at least one type of channel state information.

13. A network node having at least one reception antenna and operable to provide channel state information for a wireless communications channel provided between another network node having at least one transmission antenna and said network node, said network node comprising:
estimating logic operable to estimate a current value of at least a first type and a second type of channel state information for at least one sub-channel within said channel from signals received by said at least one reception antenna over said channel from said at least one transmission antenna;
determination logic operable to determine whether said current value of said first type of channel state information varies from a most recently transmitted value of said first type of channel state information by at least a predetermined amount; and
transmission logic operable, if said determination logic indicates that said current value of said first type of channel state information varies from said most recently transmitted value of first type of said channel state information by at least said predetermined amount to transmit of an indicator indicative of said current value of said first type of current channel state information to said first network node, and to transmit an indicator indicative of said current value of said second type of current channel state information when said determination logic indicates that said current value of said first type of channel state information does not vary from said most recently transmitted value of said first type of channel state information by at least said predetermined amount;
wherein said transmission logic is further operable to avoid transmission of said indicator indicative of said current value of said first type of channel state information when the determination indicates that said current value of said first type of channel state information does not vary from said most recently transmitted value of said first type of channel state information by at least said predetermined amount.

14. A non-transitory computer-readable medium having stored thereon a computer program operable, when executed on a computer, to perform the method of claim 1.

* * * * *